No. 896,362. PATENTED AUG. 18, 1908.
S. S. CHILDS.
RESILIENT WHEEL.
APPLICATION FILED JAN. 28, 1908.
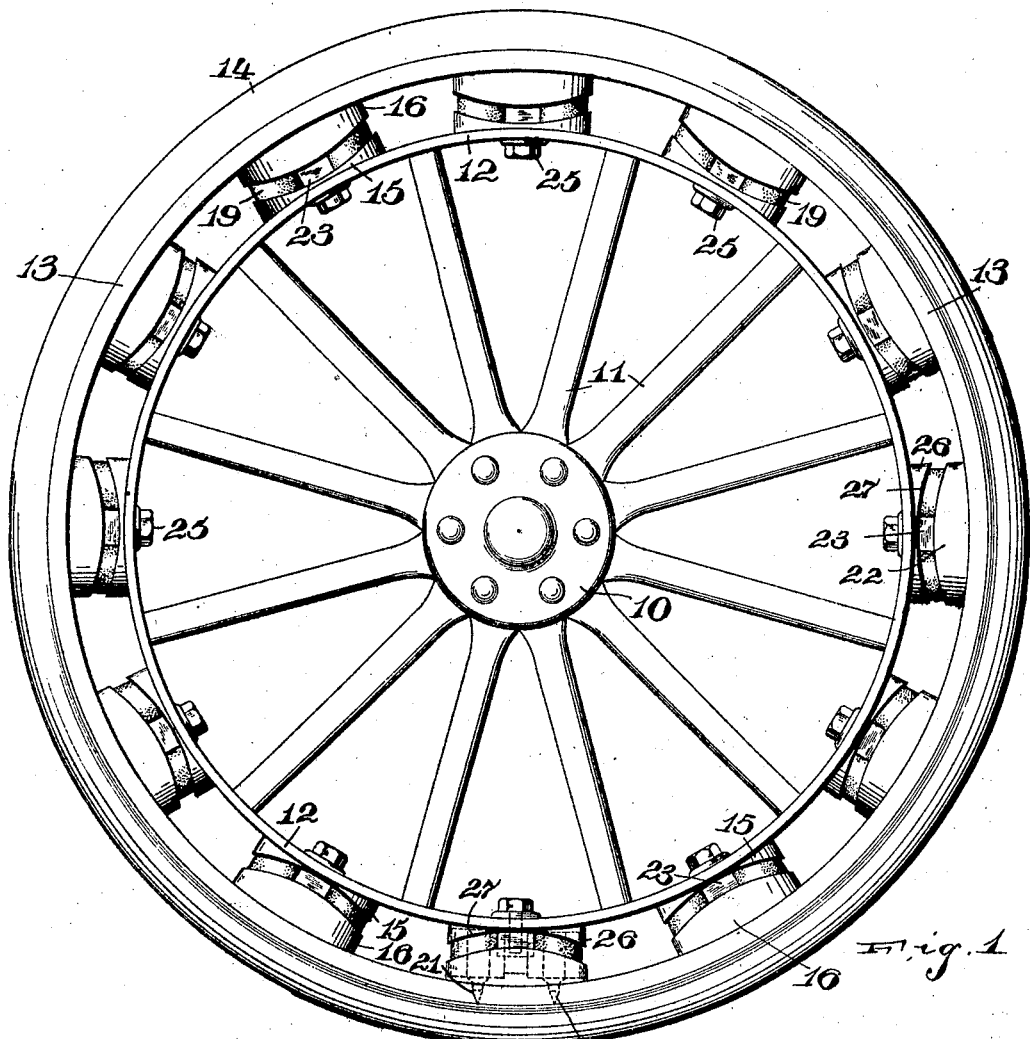
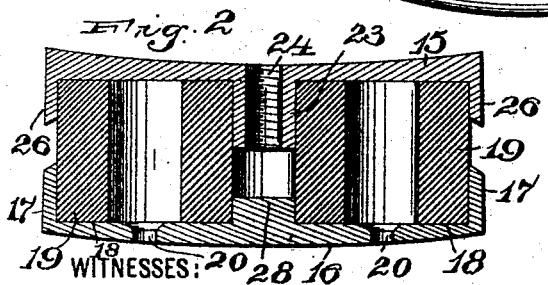
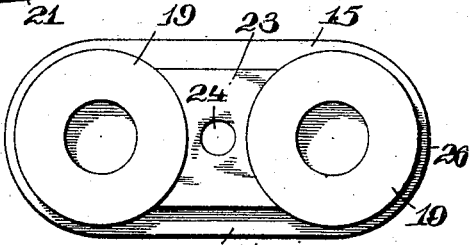
WITNESSES:
S. C. Rogers.
E. A. Pell.
INVENTOR
Samuel S. Childs,
BY
Wm. H. Canfield,
ATTORNEY.

UNITED STATES PATENT OFFICE.

SAMUEL S. CHILDS, OF BERNARDSVILLE, NEW JERSEY.

RESILIENT WHEEL.

No. 896,362.  Specification of Letters Patent.  Patented Aug. 18, 1908.

Application filed January 28, 1908. Serial No. 413,046.

*To all whom it may concern:*

Be it known that I, SAMUEL S. CHILDS, a citizen of the United States, residing at Bernardsville, in the county of Somerset and State of New Jersey, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a resilient wheel, and comprises a wheel having a body portion provided with a felly and having a rim surrounding this felly at a distance therefrom so as to form a space between the two, and blocks provided in this space to set at intervals therein, and adapted to be held in a pair of members, which are adapted to transmit the torsional strain and also any radial compression, and thus make an easy riding vehicle.

The invention is designed to provide a readily removable and replaceable series of blocks and members that hold them, one of the members being adapted to be unfastened from the felly and thus permit the transverse or side removal of this member and the blocks held thereby.

The invention is illustrated in the accompanying drawing, in which

Figure 1 is a side view of a wheel equipped with the improved resilient blocks and their holding members. Fig. 2 is a section through a pair of holding members and the blocks therein, and Fig. 3 is a bottom view of Fig. 2 with the bottom plate removed.

I employ, in this wheel, any usual form of hub 10 provided with spokes or similar members 11, and a felly 12 is placed on the ends of the spokes in the usual way. A rim 13 surrounds the felly at a distance therefrom and forms a space between itself and the felly, and this rim is provided with a tire 14 which in this wheel is preferably made of solid rubber, although any of the other well known equivalents can be used. Placed at suitable intervals around in the space between the felly and the rim are the opposed members 15 and 16. The member 16 is cut away so as to form a surrounding flange 17 and also recesses 18 for the blocks 19. Screw-holes 20 are placed in the bottom of the recesses 18 so as to receive screws 21 which bind the member 16 down to the rim. The surrounding flange 17 is raised at its center as at 22, thus forming a side bearing for a central boss 23 which is arranged on the member 15, and this boss 23 sets down between the blocks 19. This boss 23 acts to transmit and receive torsional strain from the blocks 19, and it also serves to secure the member 15 to the felly by reason of having a screw-threaded perforation 24 therein which receives a bolt 25 as shown in Fig. 1. The member 15 has a surrounding flange 26 which is formed on the sides with a curvature as at 27, to coincide with the portion 22 so that the members will be together when compression takes place, at that point, between the rim and the felly. The flanges 26 and 17 also operate to transmit torsional stress from one member to the other through the medium of the resilient blocks, and at the same time the resilient blocks make the torsional strain, when applied, act gradually on the wheel. A slightly raised portion 28 is formed in the bottom of the member 16 which helps to keep the resilient blocks from being unseated and defines the inner edges of the recesses 18.

When it is desired to remove a pair of the resilient blocks shown in Fig. 1, its bolt 25 is unloosened and then the member 15 can be slid away sidewise from the felly 12, and by means of being slightly turned, the resilient blocks can be compressed and forced out of shape enough to allow the member 15 to be passed out between the felly and the member 16. The replacement of the member 15 is correspondingly easy and simply consists in the reversal of steps cited hereinabove for the removal. The blocks 19 are preferably provided with central perforations which permit the easy riding of the vehicle and also of the wheel, and also serve to allow access to the screws 21 when the member 15 is removed, even if the resilient blocks are in place. The boss 23 extends, as shown in one of the pairs of blocks in Fig. 1, down partly inside the side flange 22 of the member 16 so that it normally engages the inside of the flanges in sliding engagement, but these bosses prevent the lateral displacement of the rim and the felly, and vice versa. This device is compact, and has no parts that are apt to be easily broken.

Having thus described my invention, what I claim is:—

1. A resilient wheel comprising a body portion having a felly, a rim surrounding the felly at a distance therefrom and forming a space between them, pairs of members placed at intervals in the space, means for securing one member to the felly, means for securing the other member to the rim, a pair of resilient blocks placed between each pair of members and in line circumferentially of the wheel, the members having flanges to surround the blocks to prevent their displacement, and a boss on one of the members to extend part way between the blocks.

2. A resilient wheel comprising a body portion having a felly, a rim surrounding the felly at a distance therefrom and forming a space between them, pairs of members arranged at intervals in the space, one member of each pair being secured to the felly and the other member being secured to the rim, the members having circular recesses near their opposite ends, a pair of cylindrical resilient blocks arranged in the recesses and in line circumferentially of the wheel, flanges on the members to surround the blocks, and a boss on one member to extend between the blocks for a portion of their length.

3. A resilient wheel comprising a body portion having a felly, a rim surrounding the felly at a distance therefrom and forming a space between them, pairs of members arranged at intervals in the space, one member of each pair being secured to the felly and the second member being secured to the rim, a pair of resilient blocks placed between each pair of members and in line circumferentially of the wheel, flanges to surround the blocks, the flanges normally having a space between them, and a boss on one member to extend between the blocks for a portion of their length and to engage the inside of the flange of the other member.

4. A resilient wheel comprising a body portion having a felly, a rim surrounding the felly at a distance therefrom, members arranged in pairs in the space between the felly and the rim, each pair of members having the opposed members secured to the felly and the rim respectively, each member having a pair of recesses arranged in line circumferentially, a pair of resilient blocks adapted to enter the recesses in each pair of members, a flange on one member having a height greatest on the ends of the member and being lowest at the center thereof, a boss bridging the inside of the member at the lowest point of the flange, the boss being adapted to extend between the blocks, and a flange on the second member, the edge of the flange being substantially parallel to the flange on the first member, being highest at the center of the member and lowest on the ends thereof.

In testimony, that I claim the foregoing, I have hereunto set my hand this twenty-fourth day of January 1908.

SAMUEL S. CHILDS.

Witnesses:
HARRY F. DEMPSEY,
WILLARD W. CUTLER.